United States Patent
Kwako

[15] 3,684,224
[45] Aug. 15, 1972

[54] HOLDER

[72] Inventor: Stanley J. Kwako, 1001 Hannifin St., Bismarck, N. Dak. 58501

[22] Filed: Oct. 16, 1970

[21] Appl. No.: 81,297

[52] U.S. Cl. ............................ 248/87, 248/175
[51] Int. Cl. ............................................ B05f 13/02
[58] Field of Search ...... 248/87, 90, 85, 75, 153, 175; 85/49; 287/49

[56] References Cited

UNITED STATES PATENTS

| | | | |
|---|---|---|---|
| 824,849 | 7/1906 | Durand | 85/49 |
| 891,059 | 6/1908 | Greer | 85/49 |
| 2,556,124 | 6/1951 | Ullrich | 248/153 |
| 2,730,388 | 1/1956 | Roberton | 248/150 X |
| 3,017,205 | 1/1962 | Williams | 287/49 |
| 3,227,408 | 1/1966 | Reed | 248/175 |
| 3,232,570 | 2/1966 | Schneider | 248/87 |

*Primary Examiner*—Chancellor E. Harris
*Attorney*—Shaffert and Miller

[57] ABSTRACT

A hose holding device is disclosed comprising first channel forming means for receiving a first section of hose, second channel forming means for receiving a second section of hose, means disposing said first channel forming means and said second channel forming means to position said first and said second channel forming means so that the second section of hose when received in the channel formed by said second channel forming means overlays the first section of hose when received in the channel formed by said first channel forming means and means adapted to contact said second section of hose and to force said second section of hose to lie substantially flat with the surface thereunder and to further force said first section of hose to lie substantially flat with the surface thereunder.

5 Claims, 5 Drawing Figures

PATENTED AUG 15 1972 3,684,224

INVENTOR,
STANLEY J. KWAKO

HOLDER

The present invention relates to a holding device. More particularly, the present invention relates to a device for maintaining a lawn soaker hose in a flat position at a point where the hose crosses over itself.

The use of lawn soaker hoses has greatly increased during the past few years. Since this hose is merely a flat hose with numerous holes on one side thereof, it is important that this hose lie flat on the area to be watered in order that the water spray will cover the desired area. Experience has shown that it is quite difficult to maintain this desired flat relationship whenever the lawn soaker hose is laid down so as to cross over itself.

Accordingly, it is an object of the present invention to provide a holder for a lawn soaker hose which will maintain the hose in a flat position as it crosses over itself.

Other objects will appear hereinafter.

For the purpose of illustrating the invention, there are shown in the drawings two embodiments which are presently preferred, it being understood, however, that the invention is not limited to the precise two embodiments shown.

Figure 1:
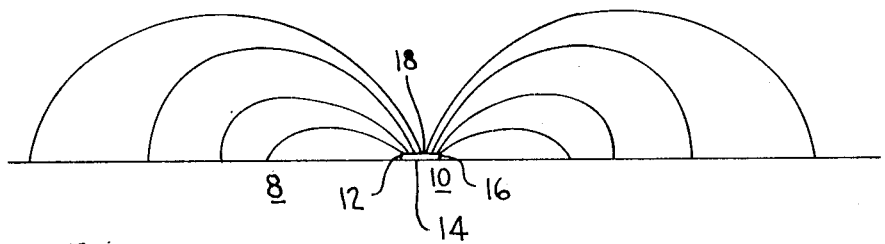
FIG. 1 shows a cross sectional view of a lawn soaker hose and its area of coverage when maintained in a desired flat posture.

Referring more particularly to the drawings wherein like numerals designate like elements, there is shown in FIG. 1 a cross sectional view of a lawn soaker hose generally designated as 10 and its area of coverage. The lawn soaker hose shown in FIG. 1 is of conventional design and comprises a flattened hose having a generally rectangular cross section. As shown in FIG. 1, the sides of the rectangular cross section are designated as 12, 14, 16 and 18. In the conventional hose shown in FIG. 1, side 18 is provided with numerous openings therein to allow water to escape therefrom as it flows through hose 10. Since hose 10, as shown in FIG. 1, lies substantially flat with surface 8, there is an equal amount of coverage on both sides of the hose.

Figure 2:
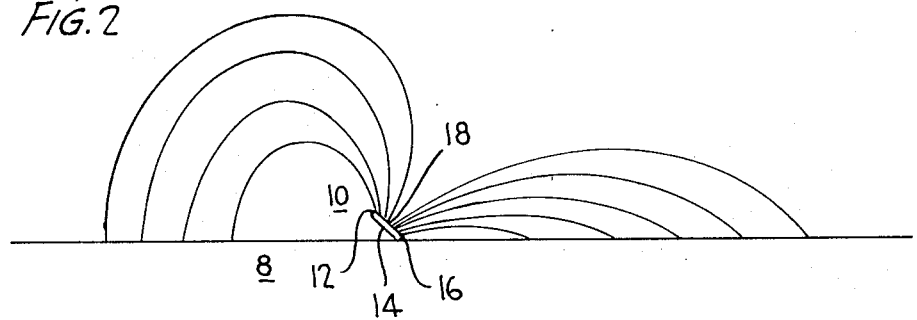
FIG. 2 shows a cross sectional view of a lawn soaker hose and its area of coverage when not maintained in a desired flat posture.

FIG. 2 shows a cross sectional view of hose 10 in a position where it is not substantially flat with respect to surface 8. This causes an uneven distribution in the amount of coverage to the sides of hose 10. As shown in FIG. 2, the area of coverage to the left of hose 10 is reduced in size from the area of coverage to the left of hose 10 as shown in FIG. 1. Similarly, as shown in FIG. 2, the area of coverage to the right of hose 10 is increased in size from the area of coverage to the right of hose 10 as shown in FIG. 1. This uneven distribution of areas of coverage on the sides of hose 10 is, of course, undesirable.

Figure 3:
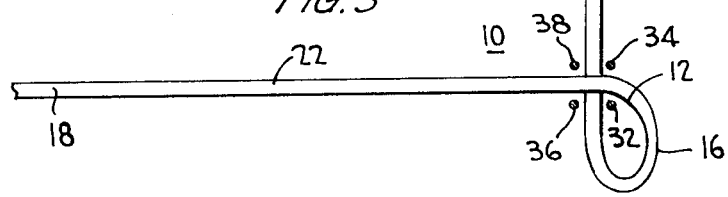
FIG 3 shows a top view of a lawn soaker hose positioned as to cross over itself.

FIG. 3 shows in top view the positioning of a lawn soaker hose in a cross over pattern. When the hose is so placed, as is explained hereinafter, it is difficult to maintain the hose in a desired flat position.

This is because the looped portion of hose 10 will not lie flat since the inside surface of the loop (side 12) is of the same length as the outside surface of the loop (side 16) while the radius of curvature of the inside surface of the loop is smaller than the radius of curvature of the outside surface of the loop. Because the looped portion of hose 10 will not lie flat, non-looped portions 20 and 22 of hose 10 (FIG. 3), because of their connection to the looped portion, will also not lie flat.

Figure 4:
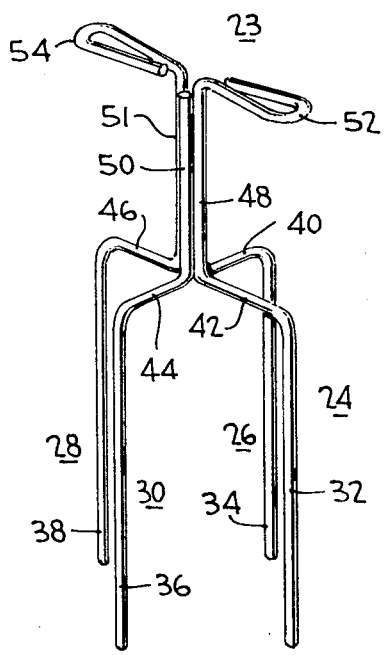
FIG. 4 shows a perspective view of a holder for a lawn soaker hose according to a first embodiment of the present invention.

FIG. 4 shows a lawn soaker hose holder 23 in accordance with the present invention having a plurality of shaped rods designated 24, 26, 28 and 30. Rod 24 is comprised of a channel forming member 32, a hold-down member 42, an attachment member 48, and a handle member 52. Similarly, rod 28 has a channel forming member 38, a hold-down member 46, an attachment member 51 and a handle member 44. Rod 30 is similar to rods 24 and 28 with the exception that rod 30 has no handle member. As shown in FIG. 4, rod 30 is comprised of channel forming member 36, hold-down member 44 and attachment member 50. Similarly, rod 26 is comprised of channel forming member 34, hold-down member 40 and an attachment member (not shown). The attachment members for rods 24, 26, 28 and 30 may be attached to each other by welding, soldering, or any other suitable joining or attaching means. Alternatively, the entire structure may be integrally formed.

As shown in FIG. 4, channel forming members 32, 34, 36 and 38 are parallelly disposed and are equidistantly spaced from a central point. Furthermore, the bottom points on channel forming members 32, 34, 36 and 38 form the vertices of a square. Accordingly, the distance between channel forming members 32 and 34, 34 and 38, 38 and 36, and 36 and 32 are equal. This distance is preferably equal to or a little bit greater than the width of lawn soaker hose 10. Accordingly, as shown in FIG. 3, lower hose section 20 may be disposed of within the channel formed by channel forming members 38 and 34 and channel forming members 36 and 32 while the upper hose section 22 may be disposed in the channel formed by channel forming members 36 and 38 and channel forming members 32 and 34.

Lawn soaker hose holder 23 may be utilized in the following manner. After the hose has been positioned, holder 23 may be placed directly over the position where the hose crosses over itself as is shown in FIG. 3. Holder 23 is then forced into the ground by application of pressure upon handle members 52 and 54. In this regard, it is noted that the ends of channel forming members 32, 34, 36 and 38 may be pointed or otherwise shaped to facilitate entry into the surface to be watered. Holder 23 should be inserted into the ground far enough to allow hold-down members 40, 42, 44 and 46 to depress the two portions of the hose thereunder to a position flat with the surface thereunder. Once this is accomplished, the effect of the looped portion of hose 10 to cause lower and upper sections 20 and 22 not to remain in a flat posture will be eliminated. Therefore, even though the small area of the looped portion of hose 10 will not lie flat with the surface thereunder, the large areas covered by lower and upper sections 20 and 22 of hose 10 will lie flat with the surfaces thereunder and will therefore result in an even distribution of coverage on either side of hose 10.

Figure 5:
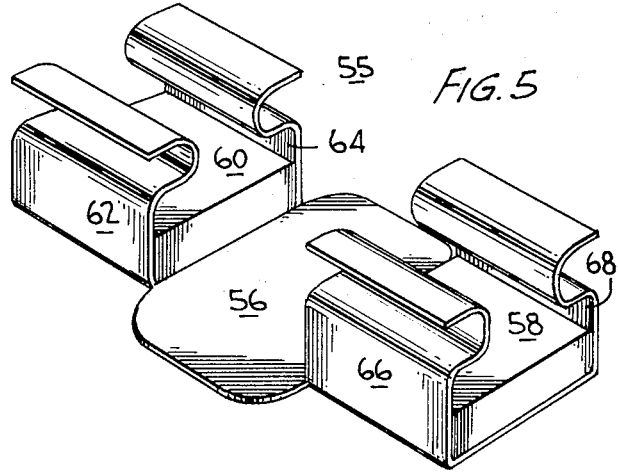
FIG. 5 shows a perspective view of a holder for a lawn soaker hose according to a second embodiment of the present invention.

FIG. 5 shows a second embodiment of the present invention. In this embodiment, the holder, designated 55, is comprised of lower channel forming member 56 which is rigidly connected to channel forming members 58 and 60 which function as lower channel forming members for one channel and further function as side channel forming members for the other channel. Channel forming member 58 is in turn rigidly secured to channel forming members 66 and 68. Similarly, channel forming member 60 is rigidly secured to channel forming members 62 and 64. The width of lower channel forming member 56 and therefore the separation between channel forming members 58 and 60 is preferably equal to or a little greater than the width of lawn soaker hose 10. Similarly, the width of channel forming members 58 and 60 is equal to or a little greater than the width of lawn soaker hose 10.

Holder 55, like holder 23, is designed to hold the hose at a position where it crosses over itself. Lower hose section 20 lies on lower channel forming member 56 in the channel formed by channel forming members 58 and 60. The hose then passes through a loop and into the channel formed by channel forming members 66 and 68 and channel forming members 62 and 64. The height of channel forming members 58 and 60 is equal to or a little less than the height of hose 10. Therefore, the positioning of upper section 22 of hose 10 will force lower section 20 of hose 10 to assume a flat position. Channel forming members 62, 64, 66 and 68 each have an upper curved portion which is designed to bear against upper section 22 of hose 10 and force it to assume a flat position. Channel forming members 62, 64, 66 and 68 are preferably comprised of resilient material to facilitate the insertion of upper section 22 of hose 10 within the channel formed by these channel forming members. Therefore, it may readily be seen that the effect of the curved portions of channel forming members 62, 64, 66 and 68 is to force upper section 22 of hose 10 to assume a flat position. Therefore, although the small looped portion of hose 10 will not lie flat with the surface thereunder, the tendency of the looped portion to cause upper and lower sections 22 and 20 to assume non-flat positions will be eliminated.

Accordingly, relatively long sections 20 and 22 will lie flat with the surface thereunder thereby resulting in an even distribution of coverage.

The present invention may be embodied in other specific forms without departing from the spirit or essential attributes thereof, and, accordingly, reference should be made to the appended claims, rather than to the foregoing specification, as indicating the scope of the invention.

I claim:

1. A hose holding device comprising a plurality of L-shaped members each having a channel forming member and a hold-down member, said L-shaped members being positioned with respect to each other such that said hold-down members are in an imaginary plane and said channel forming members are parallelly disposed and equidistantly spaced from a central point, attaching means at said central point for attaching each of said L-shaped members to at least one other L-shaped member, handle means positioned to be displaced from said hold-down member imaginary plane, said attaching means also providing a support for said handle means, said channel forming members forming a channel for receiving a first section of hose and a channel for receiving a second section of hose in a manner overlying said first section of hose, and said hold-down members being adapted to contact said second section of hose and to force said section of hose to lie substantially flat with the surface thereunder and to further force said first section of hose to lie substantially flat with the surface thereunder.

2. A hose-holding device in accordance with claim 1 wherein said attaching means comprises a given number of attachment members, said given number being no greater than the number of said L-shaped members, and each of said attachment members joining one of said hold-down members at said central point.

3. A hose-holding device in accordance with claim 2 wherein said handle member is joined to at least one of said attachment members.

4. A hose holding device in accordance with claim 3 including four of said L-shaped members, and at least two of said attachment members.

5. A hose holding device in accordance with claim 3 including four of said L-shaped members, and four of said attachment members integrally joined therewith.

* * * * *